United States Patent Office 3,608,437
Patented Sept. 28, 1971

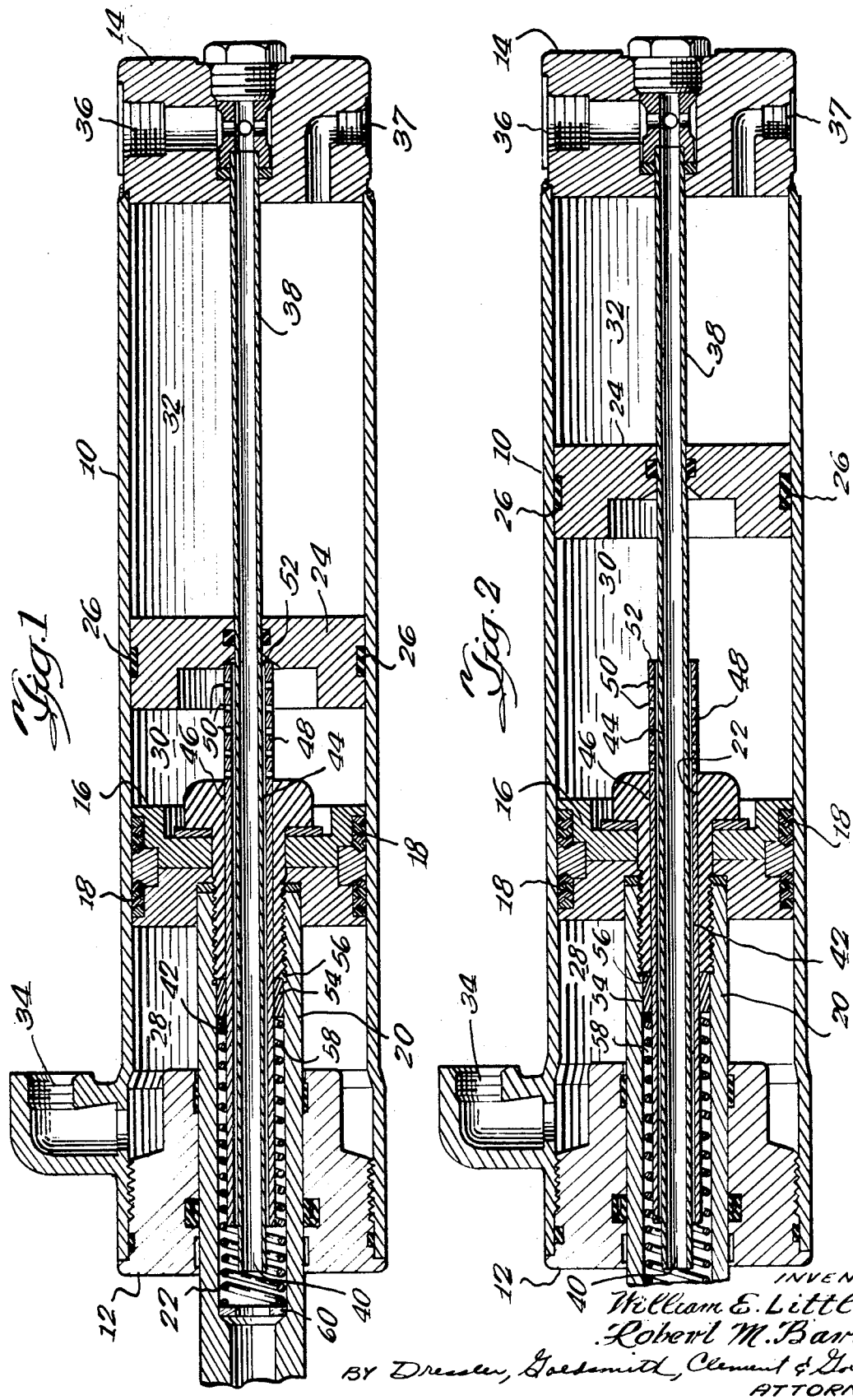

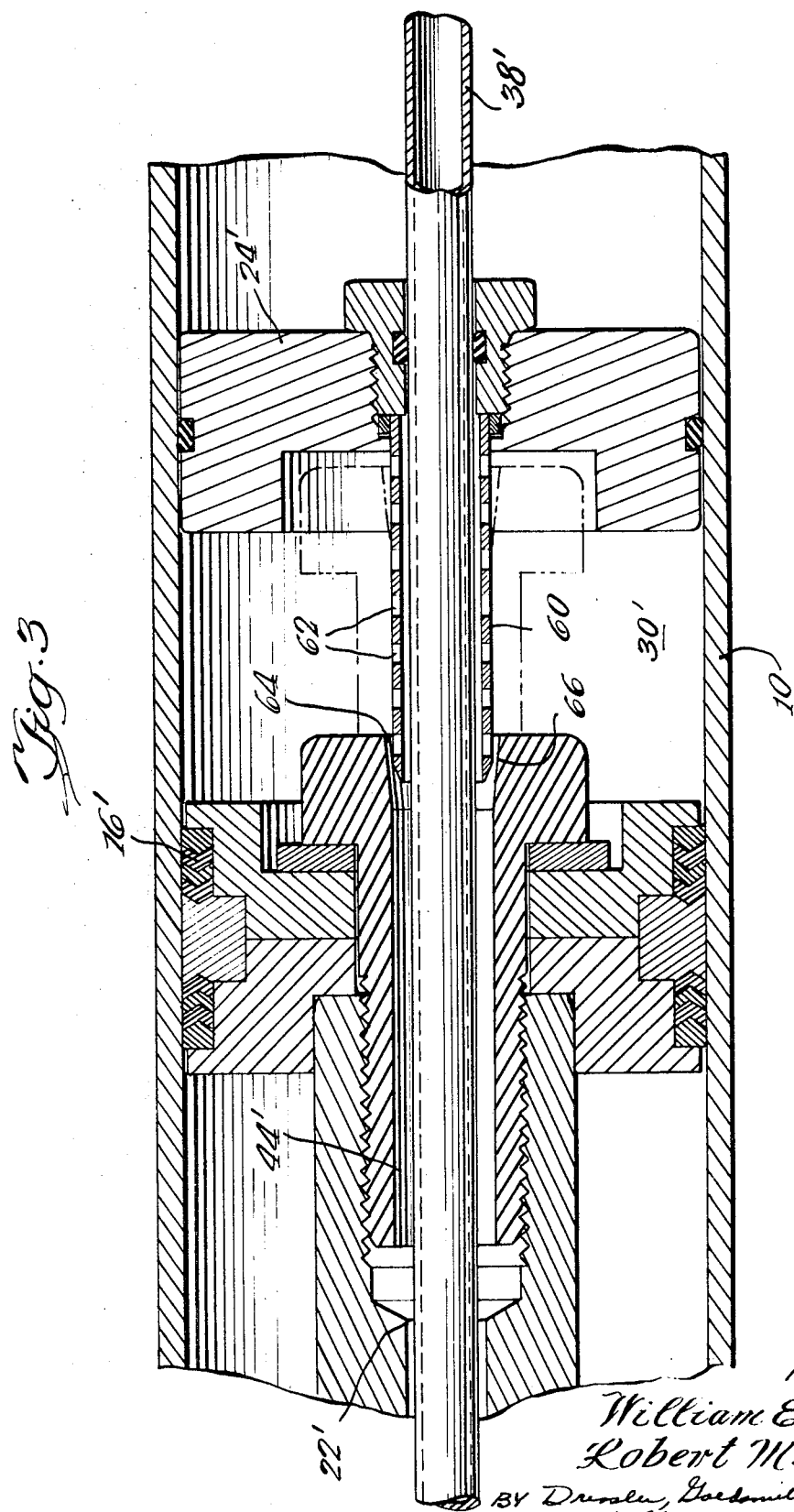

3,608,437
CUSHIONING DEVICE FOR HYDRAULIC MOTOR
William E. Little, West Burlington, and Robert M. Barton, Burlington, Iowa, assignors to J. I. Case Company
Filed Dec. 30, 1969, Ser. No. 889,255
Int. Cl. F01b *11/02*
U.S. Cl. 92—85
8 Claims

ABSTRACT OF THE DISCLOSURE

A cushioning device in a hydraulic cylinder for decelerating the movement of a piston as it approaches the head of the cylinder. The cushioning device includes a flow control sleeve having a plurality of metering apertures therein, the sleeve being mounted on either the piston or the head and adapted to be slidably engaged by the surface of a bore formed in the piston as the piston approaches the head, the surface of the bore progressively closing the metering apertures to restrict the flow of fluid and decelerate the piston. The configuration of the flow control sleeve is such that it is readily adaptable for use in a cylinder having an adjustable head for varying the length of the cylinder to effect adjustment of the stroke of the piston.

BACKGROUND

Hydraulic motors are utilized in many systems for controlling the movement of a member connected thereto. Typically, such motors consist of a double acting hydraulic cylinder with a piston having a piston rod extending from one end of the cylinder. The cylinder and piston rod are usually adapted to be connected between the member and a suitable support structure for controlling the movement of the member.

In many applications, the piston sliding within the cylinder regularly travels the full length of the cylinder, and as a result stops suddenly as it reaches its full limit of movement.

It is often desirable to avoid such sudden stops, and many such hydraulic motors and systems incorporate snubbing or cushioning means to reduce the velocity of the piston sliding in the cylinder as it approaches the limit of its movement.

Typically, such cushioning devices, when used in conjunction with the hydraulic motors, incorporate extra equipment for connection to the hydraulic motor or require a hydraulic motor construction having a relatively complicated configuration and requiring a large number of parts.

GENERAL DESCRIPTION

In accordance with the present invention there is provided a cushioning device for a hydraulic motor which can be incorporated within the motor and therefore eliminate etxraneous equipments, and which is of simple construction so that expensive modification to the hydraulic motor and associated hydraulic circuitry is avoided.

The cushioning device of the present invention, in addition to being of simple configuration, is particularly suitable for use in cylinders having a floating piston utilized as an adjustable head means to vary the length of the cylinder and effect adjustment of the stroke of the piston.

The cushioning and flow control device of the present invention may be incorporated in a hydraulic motor such as a cylinder closed at both ends and having a main piston disposed therein including a piston rod extending out the rod end of the cylinder. The head of the hydraulic motor may be defined by the other end or head end of the cylinder or by a floating piston acting as an adjustable head means disposed between the main piston and the head end of the cylinder.

The ends of the cylinder and the pistons disposed therein, define a plurality of fluid chambers, a rod chamber between the main piston and the rod end of the cylinder, a head chamber between the main piston and the head means, and, if the head means is a floating piston, an adjusting chamber between the floating piston and the head end of the cylinder. Suitable ports are formed in the cylinder to communicate hydraulic pressure to each of the fluid chambers for selectively reciprocating said main piston within the cylinder, and for selectively positioning the floatng piston or adjustable head means.

The head chamber is connected to the head port through a fluid passage defined in part by a bore formed in the main piston and piston rod and in part by an open ended tube extending from the port into the bore and disposed coaxially therewith and spaced therefrom.

The flow control means of the present invention is designed to be supported on either the main piston or on the head means, and typically takes the form of a sleeve having a plurality of axially spaced apertures formed therein. As the piston approaches the head means, it telescopically engages the sleeve which slides into the bore formed in the piston and piston rod. The piston progressively covers and thereby closes the apertures formed in the sleeve as it approaches the head means to reduce the amount of fluid flowing through the passage, thereby decelerating the piston as it moves towards the head means.

The apertured sleeve can be supported either on the head means and extend towards the main piston for slidable engagement with the bore formed therein, or alternately, can be an integral extension of a sleeve slidably supported within said bore and in sealing contact therewith.

In the latter configuration, the sleeve is supported in the bore and resiliently biased into position wherein the apertured flow control extension extends out of the piston towards the head means and is disposed in the head chamber. In this embodiment, the fluid passage consists of the head port, the interior of the tube extending from the head port into the bore, the annular space between the tube and the sleeve and the open end of the sleeve disposed in the fluid chamber.

As the main piston approaches the head means, the open end of the sleeve is closed by engagement with the head means, thereby restricting the fluid flow pattern in that the apertures formed adjacent the now closed sleeve becomes part of the fluid passage. As the piston continues to move towards the adjustable head means, the sleeve is prevented from moving with the piston because it abuts against the head means, and as a result, the surface of the bore slides over the apertures formed in the sleeve to progressively close these apertures and further restrict the fluid flow through the passage.

In the other illustrated embodiment, an apertured sleeve is supported on the head means and extends into the head chamber towards the main piston. In this embodiment, the fluid passage consists of the head port, the interior of the tube extending from the head port into the bore and the annular space between the bore and the tube, opening into the head chamber.

As the main piston approaches the head means, the bore slidably engages the apertured flow control sleeve to prevent normal flow of fluid through the open end of the bore, and restrict the fluid flow pattern by forcing the fluid to pass through the apertures in the sleeve. Continued movement of the main piston towards the head means progressively closes off more of the metering apertures to further restrict fluid flow and thereby decelerate the piston.

It can readily be appreciated that the cushioning device of the present invention is especially adaptable for use with hydraulic motors incorporating adjustable head means since the relationship of the flow control mechanism to the main piston and the head means pertains independently of whether the head means is adjustable, e.g., a floating piston, or fixed, e.g., the head end of the cylinder.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

FIG. 1 discloses one embodiment of a cylinder incorporating the fluid flow cushioning device of the present invention with the piston in position to permit unrestricted flow of fluid;

FIG. 2 is a sectional view showing the structure of FIG. 1 with the piston in position where the flow control mechanism of the present invention begins to function; and FIG. 3 is a sectional view of an alternative embodiment of the flow control mechanism of the present invention.

One embodiment of the hydraulic motor incorporated in the present invention is disclosed in FIGS. 1 and 2 and includes a tubular cylinder 10 having end members 12, 14 suitably attached to and sealing the opposite ends of the cylinder 10. A piston 16 is slidably mounted within the cylinder 10 and includes conventional sealing means 18 between the piston 16 and the inner diameter of the cylinder 10. A piston rod 20 attached to the piston 16 extends out through the rod end 12 of the cylinder 10, the piston rod and piston being generally hollow and defining a bore 22 therewithin.

The cylinder 10 also includes a floating piston 24 or adjustable head slidably disposed within the cylinder 10 and including sealing means 26 between the adjustable head 24 and the cylinder 10. The various elements of the cylinder cooperate to define a first or rod hydraulic chamber 28 between the rod end 12 and the piston 16, a second or head hydraulic chamber 30 between the piston 16 and the adjustable head or floating piston 24, and a third or adjusting chamber 32 between the head end 14 and floating piston 24.

The cylinder includes a first or rod port 34 formed in one wall of the cylinder 10 and in direct communication with the rod chamber 28, a second or head port 36 for communication with the head chamber 30, and a third or adjusting port 37 in direct communication with the adjusting chamber 32. The head port 36 communicates with the head chamber 30 through a feeder tube 38 extending from said head port 36 through said adjustable head 24 in sealing slidable relation thereto and into the bore 22 terminating in an open end 40 within the bore 22, and a sleeve 42 disposed within the bore 22 coaxially with and spaced out from the feeder tube 38 to define an annular space 44 therebetween for the passage of fluid.

The sleeve 42 extends out from the end of the piston 16 into the head chamber 30 with the external surface 46 of the sleeve 42 in sealing slidable engagement with the surface of the bore 22. An integral extension 48 of the sleeve 42 normally extends out of the piston 16 and includes a plurality of metering apertures 50 axially spaced therealong adjacent to the open end 52 of the sleeve extension 48 normally disposed in the head chamber 30.

The sleeve 42 is formed with a stop shoulder 54 which engages on one side a flange portion 56 of the bore 22 to limit the movement of the sleeve 42 under action of a biasing spring 58 disposed in the bore between the sleeve stop shoulder 54 and a back up flange 60 formed interiorly of the bore 22.

In operation, the piston 16 is moved towards the adjustable head or floating piston 24 by admitting fluid under pressure through the rod port 34 and into the rod hydraulic fluid chamber 28. Simultaneously, the head port 36 is connected to a hydraulic vent to allow the hydraulic fluid in the head chamber 30 to pass into the hydraulic passage through the open end 52 of the sleeve extension 48, along the annular space 44, into the open end 40 of the feeder tube 38 and through the feeder tube to the head port 36. The size of the annular space 44 is such as to allow free flow of the fluid from the head chamber 30 to the head port 36.

As the piston 16 moves towards the adjustable head 24, it can be seen that at a selected position of the piston relative to the head, the open end 52 of the sleeve extension 48 abuts the adjustable head 24 to close this fluid path from the head chamber 30 into the annular passage 44. As a result, hydraulic fluid flow from the head chamber 30 into the annular passage 44 is limited to the plurality of metering apertures 50 formed in the sleeve extension 48 normally disposed in the head chamber.

It can be appreciated, that as the piston 16 continues to move towards the adjustable head 24, it slides over the surface of the sleeve 42 and sleeve extension 48 which is maintained stationary in abutment with the adjustable head 24. In this way, the surface of the bore 22 progressively covers succeeding ones of the apertures 50 thereby progressively restricting the flow of fluid from the head chamber 30 into the annular space 44. As a result a back pressure builds up in the head chamber 30 thereby decelerating the movement of the piston 16 as it approaches the adjustable head 24.

Referring to FIG. 3, there is shown an alternative embodiment in which a sleeve 60 having a plurality of metering apertures 62 supported on the adjustable head 24' and extends out therefrom towards the piston 16'. In this embodiment, the fluid passage again includes the feeder tube 38' which extends into the bore 22' and annular space 44' between feeder tube 38' and the bore 22'.

As the piston 16' reaches a selected position, it slidably engages the flow control sleeve 60 to prevent the normal flow out the open end 64 of the bore 22', thereby forcing the fluid from the head chamber 30' through the metering apertures 62 formed in the sleeve 60.

It is seen that continued movement of the piston 16' towards the adjustable head 24' progressively closes off succeeding ones of the metering apertures 62 to effect deceleration of piston 16' as it nears the adjustable head 24' and approaches the position shown in dotted lines in FIG. 3. The end of the bore 22' in the piston 16' includes an outwardly tapered portion 66 so that when it is desired to reverse the operation of the piston 16', there is an area against which fluid admitted under pressure through the head port 36' acts to initiate movement of the piston 16' away from the adjustable head 24'. Because of the reduced surface and the few apertures through which the fluid can flow, the initial movement of the piston 16' to retract from the adjustable head 24' occurs at a slow rate with the speed of movement slowly accelerating as the piston withdraws from the apertured sleeve 60.

Although the present invention has been described in connection with a hydraulic motor incorporating a floating piston acting as an adjustable head, and is particularly suited for use in connection with such a configuration, it is clear that the flow control cushioning device of the present invention could function without such a floating piston the functions thereof being performed by the head end 14 of the cylinder 10.

Thus, there has been disclosed a fluid control cushioning device for a hydraulic motor which is particularly adaptable for use with cylinders having a floating piston adjustable head means and which incorporates a simple structure with a minimum of additional parts, which is simple and reliable and which effects desired deceleration of the piston as it approaches the limit of its travel within the cylinder.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A hydraulic device comprising in combination a cylinder, a piston slidably disposed in said cylinder, first and second head means disposed on opposite sides of said piston in sealing relationship with said cylinder, a piston rod affixed to said piston extending through said first head means, said piston and said first head means defining therebetween a first fluid chamber, said piston and said second head means defining therebetween a second fluid chamber, first and second port means for admitting fluid under pressure into one of said fluid chambers and out of the other of said fluid chambers for effecting reciprocable movement of said piston between said first and second head means, a fluid passage disposed between and interconnecting said second port means and said second fluid chamber, and means for controlling the fluid flow between said second fluid chamber and said fluid passage to regulate the movement of said piston as it approaches said second head means, said flow control means including metering means normally disposed in said second fluid chamber and adapted to define a part of said fluid passage when said piston is in a selected position relative to said second head means, and means associated with said piston and engageable with said flow control means for progressively closing said metering means in response to movement of said piston from said selected position towards said second head means to progressively restrict the flow of fluid through said metering means, whereby the movement of said piston is decelerated as said piston approaches said second head means, wherein said piston and piston rod define an axial bore extending through said piston and into said piston rod and forming a portion of said fluid passage, and said fluid control means includes sleeve means having said metering means formed as a plurality of longitudinally extending apertures therein adjacent to one end thereof, said sleeve means and said bore telescopically engaging with the surfaces thereof in sealing relationship when said piston moves from said selected position towards said second head means, to progressively close said apertures.

2. A hydraulic device as claimed in claim 1 including means slidably supporting said sleeve means in said bore, bias means normally and resiliently positioning said sleeve means with said apertures located in said second fluid chamber, said second head means engaging said one end of said sleeve means to prevent further movement of said sleeve means with said piston as said piston moves from said selected position towards said second head means whereby the surface of said bore progressively covers said apertures to progressively restrict fluid flow between said second fluid chamber and said fluid passage.

3. A hydraulic device as claimed in claim 1 wherein said sleeve means is carried on said second head means, and extends axially therefrom towards said piston, said bore slidably engaging said sleeve means to progressively close said apertures in response to said piston moving from said selected position towards said second head means.

4. A hydraulic device as claimed in claim 1 including a hollow tube defining a first portion of said fluid passage therewithin and extending from said second port means through said sleeve means into said bore and disposed coaxially within and spaced apart therefrom to define a second annular portion of said passage in communication with said first portion and said second fluid chamber, said sleeve being in sealing engagement with the surface of said bore and said second head means when said piston is in said selected position whereby said second portion of said passage communicates with said second fluid chamber only through said apertures.

5. A hydraulic device as claimed in claim 1 including third head means in sealing relationship with said cylinder, said second head means being slidably disposed within said cylinder between said piston and said third head means, said second and third head means defining therebetween a third fluid chamber, and third port means for admitting fluid under pressure into and out of said third fluid chamber for adjusting the position of said second head means in said cylinder.

6. A hydraulic device comprising in combination a cylinder having first and second head means closing opposite ends thereof, a piston slidably disposed in said cylinder and having a piston rod affixed thereto and extending through said first head means, said piston and piston rod defining an axial bore extending through said piston and into said piston rod, adjustable head means slidably disposed in said cylinder between said piston and said second head means, said piston and said first head means defining therebetween a first fluid chamber, said adjustable and said second head means defining therebetween a second fluid chamber, said piston and said adjustable head means defining therebetween a third fluid chamber, a first port formed in said cylinder in communication with said first fluid chamber, a second port formed in said cylinder and in communication with said second fluid chamber, a third port formed in said cylinder and extending through said second head means, a fluid passage interconnecting said third port and said third fluid chamber including a hollow tube defining a first portion of said fluid passage therewithin, and extending from said third port through said second and third fluid chambers and said adjustable head means into said bore, said hollow tube terminating within said bore, said hollow tube and the surface of said bore defining an annular space therebetween forming a second portion of said fluid passage opening into said third fluid chamber, whereby fluid under pressure is admitted into one of said first and third fluid chambers and out of the other of said first and third fluid chambers for effecting reciprocal movement of said piston between said first head means and said adjustable head means, and flow control means for regulating the movement of said piston as it approaches said adjustable head means including a sleeve supported on one of said piston and said adjustable head means and having an open end normally disposed in said third fluid chamber, means associated with the other of said piston and said adjustable head means for closing said open end of said sleeve when said piston is in said selected position to restrict said fluid passage, said sleeve having a plurality of metering apertures formed therein adjacent to said open end and adapted to define the restriction in said fluid passage when said piston is in said selected position, and means associated with said bore for progressively closing said metering apertures in response to movement of said piston from said selected position towards said adjustable head means to progressively further restrict the flow of fluid through said metering apertures, whereby the movement of said piston is decelerated as said piston approaches said adjustable head means.

7. A device as claimed in claim 6 wherein said sleeve is formed as an integral extension of a sleeve member slidably supported in said bore in sealing relationship with the surface thereof, means for biasing said sleeve member into position wherein said apertures are disposed in said third fluid chamber and said open end of said sleeve is closed by the surface of said adjustable head means when said piston is in said selected position, said adjustable head means maintaining said sleeve stationary as said piston moves from said selected position towards said adjustable head means whereby the surface of said bore progressively covers said apertures.

8. A hydraulic device as claimed in claim 6 wherein said sleeve is supported on said adjustable head means and extends axially therefrom towards said piston, the surface of said bore slidably engaging said sleeve when said piston is in said selected position to close the open end of said sleeve and to progressively close said apertures in response to said piston moving from said selected position towards said second head means.

References Cited
UNITED STATES PATENTS

| | | | |
|---|---|---|---|
| 2,921,561 | 1/1960 | Sendoykas | 91—407 |
| 2,733,691 | 2/1956 | Johnson | 92—13 |
| 845,827 | 3/1907 | Steedman | 91—407 |

MARTIN P. SCHWADRON, Primary Examiner

R. H. LAZARUS, Assistant Examiner

U.S. Cl. X.R.

91—407